United States Patent [19]
Kempf

[11] 3,749,479
[45] July 31, 1973

[54] CLAMSHELL TYPE OPTICAL MOUNTING

[76] Inventor: Paul S. Kempf, 205 Stratford Ct., Del Mar, Calif.

[22] Filed: Aug. 27, 1971

[21] Appl. No.: 175,751

Related U.S. Application Data

[63] Continuation of Ser. No. 884,065, Dec. 11, 1969, abandoned.

[52] U.S. Cl. .............................. 350/252, 350/178
[51] Int. Cl. .......................................... G02b 7/02
[58] Field of Search ............ 350/178, 187, 252–257, 350/60, 310

[56] References Cited
UNITED STATES PATENTS

| | | | |
|---|---|---|---|
| 930,210 | 8/1909 | Mills | 350/252 |
| 1,057,262 | 3/1913 | Oldfield | 350/252 |
| 2,350,110 | 5/1944 | Hood | 350/60 |
| 2,497,147 | 2/1950 | Washam | 350/252 |
| 2,532,877 | 12/1950 | Auer | 350/256 |
| 2,753,752 | 7/1956 | Veverka | 350/252 |
| 3,503,004 | 3/1970 | Haisma et al. | 350/310 |

FOREIGN PATENTS OR APPLICATIONS

| | | | |
|---|---|---|---|
| 1,058,001 | 2/1967 | Great Britain | 350/187 |

*Primary Examiner*—David Schonberg
*Assistant Examiner*—Michael J. Tokar
*Attorney*—Carl R. Brown

[57] ABSTRACT

An optical mounting having a pair of clamshell type elements preformed to hold a specific array of optical components between the elements in precise optical alignment, without the need for individual spacers, lock rings and the like. Portions of the mounting elements have limited deformability to accommodate reasonable discrepancies in thickness and diameter of lenses and other optical components. Low cost, easily formed plastic material is used for the mounting elements, the assembly being held in an enclosing sleeve or barrel as a secure optical unit.

13 Claims, 4 Drawing Figures

PATENTED AUG 31 1973 3,749,479

*INVENTOR.*
PAUL S. KEMPF

BY Carl R. Brown
    ATTORNEY

CLAMSHELL TYPE OPTICAL MOUNTING

This is a continuation of application Ser. No. 884,065 filed Dec. 11, 1969, now abandoned.

BACKGROUND OF THE INVENTION

In a compound lens assembly, or similar optical unit, the lenses are held in a rigid barrel with machined shoulders to position certain of the lenses, and a series of spacing and locking rings to hold the components in place. Alignment relative to the optical axis is dependent on the accuracy of cutting the lenses to diameter, and discrepancies in lens thickness can cause axial spacing errors which may be accumulative in some assemblies. Manufacture is costly and assembly is by hand, considerable skill being necessary to position components in a complex system without soiling or damaging the optical surfaces, or inadvertently mounting a lens inclined to the optical axis.

SUMMARY OF THE INVENTION

In the mounting described herein, the optical components are inserted in their respective positions in a preformed clamshell element, then a second similar clamshell element is fitted over the assembly, which is inserted and secured in a barrel or sleeve. The clamshell elements have sockets, channels, shoulders and other positioning means configured to suit specific lenses and other optical components. Portions of the positioning means have limited deformability to accommodate reasonable discrepancies in the lenses, and ensure firm holding in precise optical alignment. The clamshell elements are of plastic material which is easily formed and, by its resilience, permits some degree of final focus adjustment in an integral portion of the structure. In the assembly operation, one clamshell element acts in the manner of a tray, into which the optical components are placed within a minimum of handling and without the need for manual contact of the clean optical surfaces. When the second clamshell element is fitted in place, the optical assembly and alignment is complete and the assembled unit is pressed into the close fitting barrel which is the external housing. Disassembly for servicing is equally simple, all optical components being exposed simultaneously for inspection.

An object of this invention, therefore, is to provide an optical mounting in which a plurality of optical components are held in precise alignment between preformed clamshell elements and secured as a complete optical assembly in a close fitting outer housing.

Another object of this invention is to provide an optical mounting in which the clamshell elements are of plastic material and are adaptable to a wide variety of optical components, symmetrical or otherwise.

Other objects and many advantages of this invention will become more apparent upon a reading of the following detailed description and an examination of the drawings, wherein like reference numerals designate like parts throughout and in which:

DESCRIPTION OF THE PREFERRED EMBODIMENTS

Figure 1:
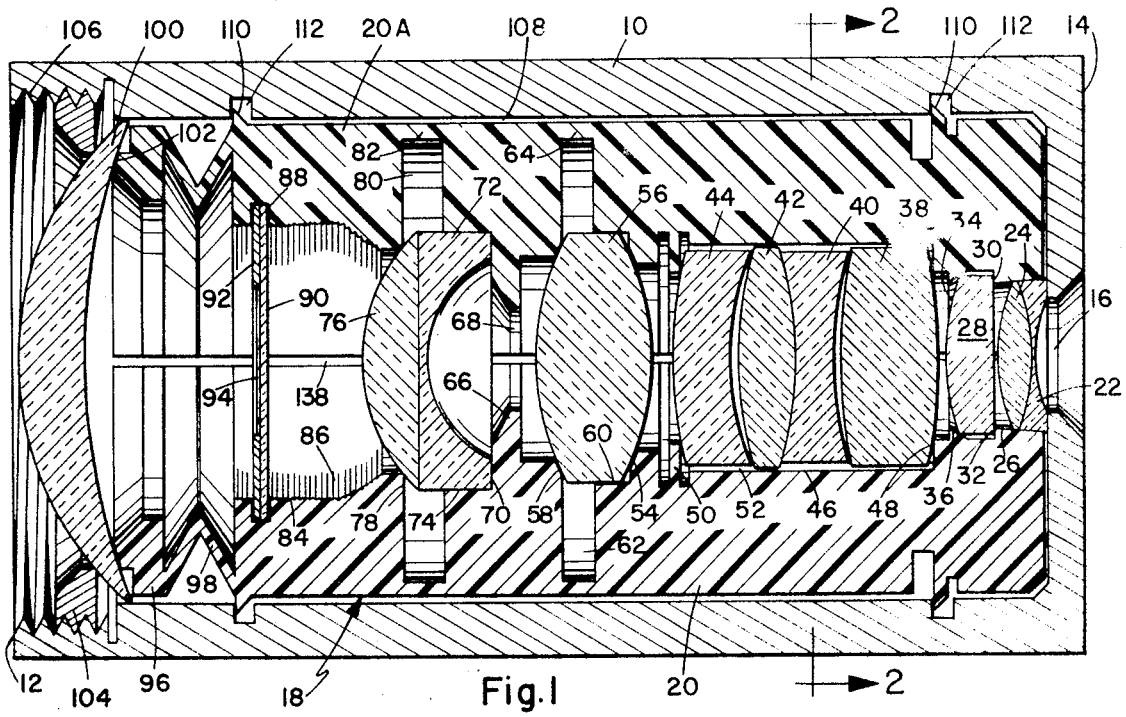
FIG. 1 is an axially extending, diametrical cross section of a typical optical assembly.
Figure 2:
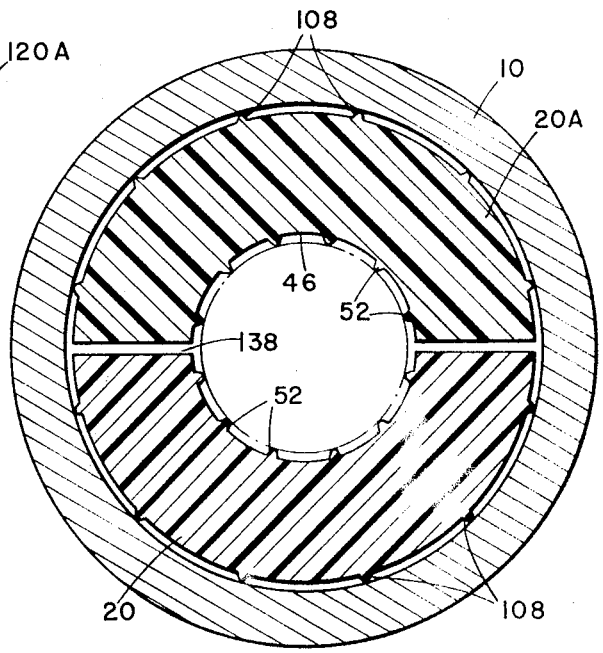
FIG. 2 is a sectional view taken on line 2—2 of FIG. 1.

The lens unit shown in FIGS. 1 and 2 has a rigid cylindrical barrel 10, having an open end 12 and a closed end 14 with an axial opening 16. For purposes of description the open end will be considered the front of the unit. Inside barrel 10, which comprises the protective housing, is a lens unit 18 with a pair of clamshell elements 20 and 20A, separated diametrically along the longitudinal axis, each clamshell element thus being generally semi-cylindrical. The lens array shown is a typical example and various configurations of holding and aligning means are used. In this arrangement, all the optical components are standard circular types and both clamshell elements are identical, so only one need be described in detail.

Starting from the rear or right hand end at opening 16, a double concave lens 22 and double convex lens 24 are mounted as a pair in a tapered socket 26 conforming to the taper of the lens periphery. Next is a lens 28 having a flat rear face 30 the periphery of which seats against a rigid shoulder 32, and a convex face 34 which jams against a bevelled rib 36, convergent away from shoulder 32. Forward of lens 28 is a group of lenses 38, 40, 42 and 44 held in a cylindrical bore 46 in the clamshell element, the grouped lenses seating against a rear shoulder 48 and being held axially by an inwardly projecting flange 50 at the forward end of the group. Flange 50 has sufficient resilience to hold the grouped lenses securely. The inside of bore 46 has a plurality of small ribs 52, circumferentially spaced and extending longitudinally, the ribs being deformable under pressure. Grouped lenses 38 to 44 are indicated as being of slightly different diameters, but are all held securely since the ribs 52 compress as necessary during assembly to accommodate the differences.

Forward of flange 50 is an inwardly projecting shoulder 54, contoured to fit the rear face of a double convex lens 56, a further shoulder 58 bearing against the forward face of the lens. Lens 56 is centered in a socket 60 holding the rear portion of the lens. At the forward portion of lens 56 is a deep, radially outwardly extending channel 62, leaving a thin peripheral wall 64 in the clamshell element, to provide resilience for gripping the lens between the axially spaced shoulders 54 and 58.

Forward of lens 56 is a radial wall 66 having an axial aperture 68 which serves as a light stop. Similar limiting stops, integral with the clamshell elements, could be used at other positions as necessary. The forward face of wall 66 provides a shoulder 70 against which a plano-concave lens 72 is seated and centered in a socket 74. A plano-convex lens 76 is secured on the forward face of lens 72 and is retained by a shoulder 78. A deep radial channel 80 extends outwardly at the forward portion of lens 72, leaving a thin peripheral wall 82 for resilience.

Forward of lens 76, the clamshell element has an enlarged bore 84, the surface of which has circumferential ribs 86, or similar roughening, to reduce internal reflections. In the forward portion of enlarged bore 84 is an annular channel 88 to hold a transparent reticle 90, on which is a frame 92 carrying a cross hair 94, or other such reference means. Suitable markings could be engraved or otherwise applied directly to the reticle glass in a well known manner.

The forward end of the clamshell element has a ring portion 96, joined to the main body of the clamshell element by an axially compressible corrugation 98, shown as being substantially V-shaped in cross section. A concave-convex lens 100 seats on the forward face 102 of ring portion 96 and is held by a retaining ring 104 screwed into the internally threaded end 106 of barrel 10. Corrugation 98 accomodates limited compression and allows for precise focus adjustment of lens 100.

To ensure a firm fit in barrel 10 without undue binding friction during assembly, the clamshell elements have external longitudinally extending ribs 108, which can deform slightly as the lens unit is inserted. The optical assembly is thus securely held under radial compression, with all lenses accurately centered. Additional locking means against axial shifting is provided by radially projecting lugs 110, which seat into internal annular grooves 112 in the front and rear portions of barrel 10. The lugs can be short projecting elements or complete annular rings on the clamshell elements.

In the configuration thus far described, various arrangements of sockets, shoulders, retaining flanges and the like are shown, with different means for incorporating resilience in the clamshell element to ensure positive gripping of the lenses. The two clamshell elements are essentially identical, since all the optical elements are axially symmetrical. While the barrel is indicated as being a right cylinder, it should be noted that other cross sectional configurations may be used for special optical systems, the term barrel being intended to refer to any rigid external housing which will contain the assembled clamshell structure.

Figure 3:
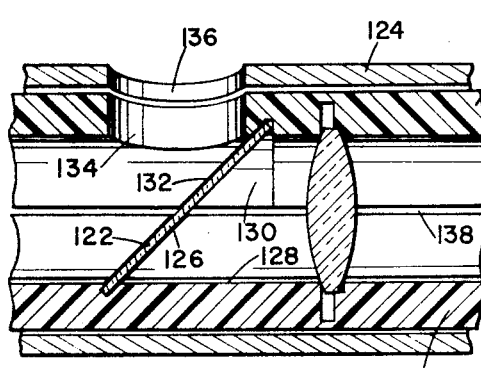
FIG. 3 is a view similar to a portion of FIG. 1, on a reduced scale, but showing the mounting of an inclined mirror in the clamshell elements.

A non-symmetrical arrangement is shown in FIG. 3, in which clamshell elements 120 and 120A are formed to hold a beam splitting mirror 122, diagonal to the optical axis. The clamshell elements fit into a barrel 124 and the general features are as described above to suit the specific optical system used. Clamshell element 120 has an inclined slot 126 in axial bore 128, in which the mirror 122 is inserted during assembly. The other clamshell element 120A has a recess 130 with a diagonal forward face 132 against which the mirror 122 seats, the rear portion of the recess having radial clearance for the mirror. This is necessary to permit assembly of the clamshell elements in a radial direction with various lenses in place. Clamshell element 120A and barrel 124 have corresponding openings 134 and 136, through which a portion of the light is reflected from mirror 122. Other non-symmetrical components, such as prisms, wedges and the like could be held by suitable configuration of the clamshell elements.

Figure 4:
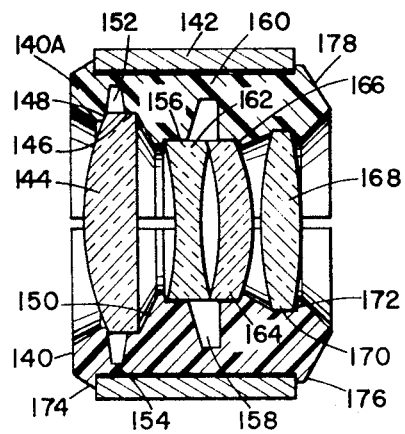
FIG. 4 is a sectional view of a further form of optical assembly.

Another form of the clamshell structure is shown in FIG. 4, in which a pair of clamshell elements 140 and 140A holding the optical components, snap into place in a cylindrical barrel 142. At the left hand end of the assembly, a lens 144 is held in a socket 146 between a shoulder 148 and inwardly projecting rib 150. An outwardly extending channel 152 that is radial to the lens 144 leaves a thin outer wall 154 for resilience. On the other side of rib 150 is an axial bore 156, having a radial channel 158 with an outer resilient wall 160. Lenses 162 and 164 are held in bore 156 between rib 150 and a shoulder 166. At the right hand end, a lens 168 is held in a socket 170 by an end shoulder 172.

The left hand end of each clamshell element 140 and 140A has an external stop flange 174 which abuts one end of barrel 142. At the other end is an external locking flange 176, that end of the clamshell elements having a bevelled face 178 to facilitate pushing the assembly through the barrel until the locking flange snaps over the other end of the barrel. The assembly is thus securely locked in place with any additional fastening means, the resiliency of the plastic clamshell elements ensuring a firm structure.

The use of molded plastic clamshell elements ensures consistency in dimensional accuracy and all optical components are positively aligned and secured by the integral locating and holding structure, which accommodates minor manufacturing inaccuracies in the optical components. Assembly is greatly facilitated and the optical surfaces need not be touched by hand or by tools. A flat, non-relfective finish can be incorporated into the plastic material, eliminating the flaking problem encountered with painted metal surfaces. Strain on the optical components due to thermal expansion and contraction of the mounting structure is also avoided. Since the clamshell elements are dimensioned to hold the optical components by a clamping action, the confronting faces of the elements do not actually meet. The resultant gap, indicated at 138, facilitates purging of the lens unit, as by nitrogen, to remove moisture. While the structure is shown with a pair of clamshell elements, it will be obvious that three or more elements could be used for specific assembly arrangement.

Having described my invention, I claim:

1. An optical mounting comprising, an outer barrel, at least two resilient coacting and mating half-cylindrical shells forming a substantially circular, tubular unit fitting closely in said barrel, said tubular unit having an axial bore with internal integral locating portions projecting radially inwardly into said bore for holding and axially positioning optical components within the bore, said locating portions including at least one aligned radial recess in each of said shells for receiving an optical component, said recess having opposing sides that bear against each side of the optical component, with one of said sides of said recess being less resilient than said other side, said less resilient side locating the optical component in longitudinal and radial alignment in the bore, and the optical component having a thickness longitudinally to the bore that is greater than the width of said radial recess, whereby the more resilient side of said recess resiliently biases the optical component against said less resilient side, longitudinally and axially aligning the component.

2. An optical mounting according to claim 1 wherein, said optical component comprises a lens, and said locating portions include a radially inwardly projecting shoulder providing a seat for one side of the lens, and a bevelled rib, convergent away from said shoulder for peripheral engagement of the lens.

3. An optical mounting according to claim 1 and including a substantially radial wall integral with each of said shells and having a light limiting axial aperture therethrough.

4. An optical mounting according to claim 1 wherein, said recess including a circular outer surface for contacting without compression the outer radial surface of said optical component, said locating portions including a radially inwardly projecting less resilient shoulder providing a seat for one side surface of said optical component, and a radially inwardly projecting axially resilient flange for engagement with the other side surface of said optical component that resiliently forces said optical component along said outer radial surface and against said less resilient shoulder, axially positioning said optical component.

5. An optical mounting according to claim 1, wherein, said half-cylindrical shells having at one end a first external flange section of greater diameter than the internal diameter of said barrel and the outer diameter of said mated shells, said first external flange section being substantially rigid and non-deformable, said half-cylindrical shells having at their other end a second external flange section of greater diameter than the internal diameter of said barrel and the outer diameter of said mated shells, said second flange section having a thin deformable construction for being deformed sufficiently for passage through the barrel and resiliently return to the original diameter upon completion of passage through the barrel and abutting the end of the barrel arresting longitudinal movement of the half-cylindrical shells within said barrel.

6. An optical mounting according to claim 1 wherein said locating portions include axially spaced opposed shoulders between which a lens is held, said shells having channels extending radially outwardly beyond the edge of the lens leaving a resilient outer peripheral wall portion between said opposed shoulders to resiliently bias the lens to substantially longitudinal and radial optical alignment.

7. An optical mounting according to claim 1 wherein said barrel has a partially closed end against which one end of said half cylindrical shell assembly is axially seated, the other end of said shell assembly having an axially resilient compressible portion, and retaining means entirely positioned in said barrel for engaging said other end portion in axial clamping securement.

8. An optical mounting according to claim 1 wherein said barrel has at least one annular internal groove that solely extends circumferentially to said barrel, and said shells having integral radially projecting stop means for seating in said groove.

9. An optical mounting according to claim 1 wherein, said barrel has a partially closed end means for axially retaining one end of said shell element assembly, the other end of said shell assembly has an axially resilient compressible bellows, first means in said shell assembly for retaining a first lens between said compressible portion and said one end, second means in said shell assembly for retaining a second lens between said compressible portion and said other end, and retaining means for coacting with said barrel and said other end of said shell assembly and exerting force on said other end to compress said compressible portion and control the distance between said first and second lens.

10. An optical mounting according to claim 1, wherein said half cylindrical shells have integral external axially extending ribs, with resilient limited deformability for frictional engagement with the interior of the barrel.

11. An optical mounting according to claim 1 wherein said locating portions include a bore portion having integral internal axially extending ribs, with limited deformability, to resiliently grip lenses of slightly different diameters and bias the lenses to radial optical alignment.

12. An optical mounting according to claim 1 wherein said locating portions include a radially inwardly projecting shoulder providing a seat for one side of a lens, and an inwardly projecting axially resilient flange for engagement with the other side of the lens to cooperatively position and adjust the lens to longitudinal and radial optical alignment.

13. An optical mounting according to claim 1 wherein, said compressible portion comprises a bellows structure.

* * * * *